United States Patent [19]

Taff et al.

[11] Patent Number: 4,532,917
[45] Date of Patent: Aug. 6, 1985

[54] MODULAR PASSIVE SOLAR ENERGY HEATING UNIT EMPLOYING PHASE CHANGE HEAT STORAGE MATERIAL WHICH IS CLEARLY TRANSPARENT WHEN IN ITS HIGH-STORED-ENERGY LIQUID STATE

[76] Inventors: Douglas C. Taff, P.O. Box 85; Robert B. Holdridge, P.O. Box 167, both of Hinesburg, Vt. 05461

[21] Appl. No.: 653,923

[22] Filed: Sep. 24, 1984

Related U.S. Application Data

[63] Continuation of Ser. No. 562,715, Dec. 19, 1983, abandoned, which is a continuation-in-part of Ser. No. 444,607, Nov. 26, 1982, abandoned, which is a continuation-in-part of Ser. No. 226,395, Jan. 19, 1981, abandoned.

[51] Int. Cl.³ ............................................. F24J 3/02
[52] U.S. Cl. .................................... 126/430; 126/400; 126/431; 165/DIG. 4; 165/48 S; 165/104.17; 252/70
[58] Field of Search ............... 126/400, 901, 429, 430, 126/435, 436, 431; 165/48 S, DIG. 4, 104.17, 104.15; 252/73, 70; 52/173 R

[56] References Cited

U.S. PATENT DOCUMENTS

| | | | |
|---|---|---|---|
| 2,677,367 | 5/1954 | Telkes . | |
| 3,537,944 | 11/1970 | Grubb et al. | 126/901 |
| 4,111,189 | 9/1978 | Dizon | 126/436 |
| 4,162,671 | 7/1979 | Christy | 126/400 |
| 4,244,354 | 1/1981 | Williams | 126/901 |
| 4,257,477 | 3/1981 | Maloney | 126/430 |
| 4,286,576 | 9/1981 | McClelland . | |
| 4,290,416 | 9/1981 | Maloney | 126/400 |

OTHER PUBLICATIONS

"Kalwall Thermal Storage Pod".
"Phase Change Materials Handbook", Sep. 1971, U.S. Dept. of Commerce, National Technical Information Service, N72-19956, D. V. Hale, et al.; Lockheed Missiles & Space Co.
"The Status of Thermal Energy Storage", by Bundy, Herrick & Kosky of Power Systems Laboratory, Report No. 76 CRD041, Apr. 1976.

Primary Examiner—Samuel Scott
Assistant Examiner—Helen Ann Odar
Attorney, Agent, or Firm—Parmelee, Bollinger & Bramblett

[57] ABSTRACT

A highly effective modular passive solar energy heating unit for heating an enclosed space employs phase change heat storage material, which is optically transparent to visible light when in high-stored-energy liquid state enabling a viewer to see through clearly and which is translucent milky white when in low-stored-energy solid state for providing pleasant illumination to the enclosed space when first illuminated by sunlight in the morning. This phase change material, in a sealed container having two opposite surface areas transparent to sunlight, is polyethylene glycol having a heat of fusion of about 33 to 37 cal./gm. (4,170 to 4,670 Btu's per cubic ft.), a melting point of about 13° to 25° C. (55° F. to 77° F.), a specific gravity of about 1,125 at 20° C., and desirable isotropic freezing and melting characteristics with only very modest volume change during phase change. A dye soluble therein may be included for increasing solar-energy-absorptivity when translucent and for decreasing glare and direct penetration of sunlight into the space when transparent. The unit additionally contains at least one clearly optically transparent glazing layer facing the sunlight, preferably including an insulation layer to transmit short wavelength solar radiation while blocking longer heat rays for retaining thermal energy within the enclosed space. In preferred embodiments, there are two layers of closely spaced parallel transparent glazing near the sealed container, these layers being between incident solar radiation and the container.

27 Claims, 10 Drawing Figures

Fig. 1H.

MODULAR PASSIVE SOLAR ENERGY HEATING UNIT EMPLOYING PHASE CHANGE HEAT STORAGE MATERIAL WHICH IS CLEARLY TRANSPARENT WHEN IN ITS HIGH-STORED-ENERGY LIQUID STATE

This application is a continuation of copending application Ser. No. 562,715, filed Dec. 19, 1983, now abandoned, which was a continuation-in-part of copending application Ser. No. 444,607, filed Nov. 26, 1982, now abandoned, which, in turn, was a continuation-in-part of application Ser. No. 226,395, filed Jan. 19, 1981, now abandoned.

FIELD OF THE INVENTION

The invention relates to the field of passive solar energy heating units and more particularly to modular passive solar energy heating units employing a heat storage phase change material.

BACKGROUND OF THE INVENTION

Energy from the sun reaches the earth as electromagnetic radiation which can be absorbed by suitable surfaces and converted to heat. In general, the use of various solar energy collection systems has been known in the art. For example, it has heretofore been known to employ air source heat pumps to make use of solar energy stored in the atmosphere. Additionally, it has been known to use solar water heaters for this purpose in which water is circulated through a solar collector to be heated and the heated water is used to transfer heat energy to the place desired. However, the storage material is not exposed to the sun's rays, but instead the water is circulated by pumps or thermosiphons through a solar collector and then through a heat storage device in a serial manner. In some cases, a large container of water itself may serve as the heat storage device. Diurnal variations in insulation and atmospheric heat makes these active solar energy collection systems far from ideal. Also, there are complexities in the pumps or circulating systems which make such systems expensive. Further, the solar collectors are positioned in expose locations, for example on a roof, where they are subject to battering by storms and where they quickly lose their heat into the atmosphere when the sun's rays are blocked by clouds in the winter.

Among the materials heretofore used as sensible heat storage materials, water has most frequently been employed due to its high heat capacity and ready availability and low cost. Stored heat is moved to an area to be heated by circulating the heated water or heat exchanging it with circulating air. Water has also been employed in the roof pond and storage wall concepts of solar heating. Also, rocks and stones placed in an insulated storage space and adapted to heating and cooling by passing air through the interstitial spaces within the assemblage of rocks or stones and circulating the air to the space to be heated has also been employed. There has also been employed a hybrid of rocks and water where a tank is located in the center of a rock storage bin and air is circulated through the rocks which collect heat lost from the water tank.

Additionally, Trombe has developed a system whereby a relatively massive masonry wall is positioned behind panes of glass with an air space between the glass and wall. Openings at the top and bottom of the wall allow for gravity circulation of heated air into the interior space to be heated at the back side of the wall. This interior (or enclosed) space is also heated by thermal radiation from the rear (inside) surface of the solar heated Trombe wall, but the Trombe wall blocks illumination and view.

More recently, heat of fusion heat storage has received some attention as a means of storing solar energy. Most recently, paraffin waxes and fatty acid materials have been suggested for use as heat of fushion heat storage materials but have not found acceptance. Sodium sulfate decahydrate has received the most attention in this area, but problems of precipitation and immobilization or encapsulation of solid anhydrous sodium sulfate during the freeze-thaw cycles has caused degradation of the system and prevented its wide acceptance and use. Disodium hydrogen phosphate dodecahydrate has also received attention, but its thermal efficiency gradually decreases with increasing numbers of freeze-thaw cycles due to the heptahydrate formation which is the equilibrium solid phase at the melting temperature of the dodecahydrate.

Recently, a product containing calcium chloride hexahydrate has been merchandised by Kalwall Corporation, of Manchester, New Hampshire. This product comprises thermal storage pods which can be assembled into a translucent thermal storage wall. Because of the very high expansion coefficient and anisotropic freezing and thawing characteristics of calcium chloride hexahydrate amount in effect to a volumetric change of approximately twenty percent during freezing/melting of this particular hydrated salt, a strong, flexible, expandable volume fiberglass-reinforced container must be used. Because of the fibrous nature of the necessarily reinforced container, a clear, optically transparent viewing through a wall of the Kalwall storage pods is unattainable.

Calcium chloride hexahydrate and any of the other water-and-salt eutectic thermal storage hydrates are unusable in planar, parallel sided, optically-transparent, rigid containers in a window configuration, for example, such as a window formed from two relatively closely spaced sheets of optically clear glass, because of their very high effective volumetric change during thawing/freezing. The anisotropic freezing/thawing characteristics of these water-and-salt hydrate eutetic materials, i.e. their tendency to form crystals during freezing which grow more rapidly in one direction than in other directions, augments the problems of attempting to employ them in a planar, parallel-sided optically transparent rigid container in a window structure.

A paper presented during the Fifth National Passive Solar Conference in Amherst, Mass. on Oct. 22 to 26, 1980, by J. R. Hull, J. F. McClelland, L. Hodges, J. L. Huang, R. Fuchs and D. A. Block, entitled *Effect of Design Parameter Change on the Thermal Performance of a Transwall Passive Solar Heating System* discusses a visually transparent thermal storage wall containing water and which is placed in building areas receiving direct solar radiation. A severe difficulty with such a water-filled external wall is that a power failure or heating system failure within the building during winter can allow rapid freezing of the water with resultant destruction of the entire wall due to the enormous expansion pressure of freezing water. Furthermore, thermal storage in water involves only a single-phase storage action in which the temperature of the water increases when heat energy is added and its temperature decreases as heat energy is withdrawn. Thus, the temperature of the associated enclosed space may be allowed to swing up and down over an uncomfortably large temperature range for the occupants during a twenty-four hour cycle. A further severe problem with such a thermal storage wall containing water is that a thickness of at least 5 cm (2 inches) is necessary to obtain at least 80% of the maximum solar savings fraction (beneficial results as defined in the article). Therefore, the weight when calculated on the basis of an entire building structure becomes adversely significant. Such a water-filled wall containing two inches of water weighs 10.4 pounds per square foot, for the water alone.

Such a single-phase acting thermal storage with its inherent temperature fluctuation is quite different from a phase change material in which the temperature remains approximately constant during addition or withdrawal of heat energy. The addition of heat energy causes melting of the material (change of phase from solid to liquid), and the withdrawal of heat energy causes freezing (change of state from liquid to solid), but the melting and resolidification occur at approximately constant temperature, called the "melting point". Therefore, among the advantages of a phase change material are those resulting from the fact that it tends to hold the temperature of the associated enclosed space more nearly constant than a single-phase acting material of equal thermal energy thermal energy storage capacity. In addition, a phase change material can store many times more thermal energy per unit volume than a single-phase acting material such as a body of water, a collection of rocks, or a Trombe wall. Thus, a considerably less bulky storage apparatus of phase change material has the same thermal storage capacity as a more bulky apparatus containing a much larger quantity of single-phase acting storage material.

There is, therefore, still a need for an improved solar energy heating unit that eliminates many of the undesirable features of systems heretofore proposed. A desirable system would be a solar energy heating system that employs many of the desirable features of heretofore studied systems but that eliminates and/or avoids most or substantially all of the undesirble features or drawbacks of prior systems. Additionally, it is highly desirable to have a system that employs a highly effective heat-of-fusion heat storage material that has a relatively high heat of fusion at the desired temperature range for heating a living or working space, yet which material is stable and does not separate nor segregate in use and is also non-toxic and non-corrosive. It is also desirable to have such a material that has a very small coefficient of thermal expansion. An acceptable material must be a phase change material that has a relatively high storage of thermal energy per unit of volume during its phase change.

SUMMARY OF THE INVENTION

According to the present invention, it has been discovered that a highly effective and desirable modular passive solar energy heating-illuminating-and-viewing unit for an enclosed space (living space or working space) can be obtained when polyethylene glycol characterized by a heat of fusion of about 33 to 37 cal./gm. (4,170 to 4,670 Btu's per cubic ft.), a melting point of about 13° to 25° C. (55° to 77° F.) and a specific gravity of about 1.125 at 20° C. (68° F.), plus isotropic freezing and melting characteristics, with only a very modest change in volume of less than 2% during phase change is employed in a container in the units, said container having front and back surface areas which are transparent to sunlight, and wherein the solar energy heating unit employs at least one transparent glazing layer spaced from the container by an air space, said glazing preferably including a layer of insulation for transmitting short wavelength solar rays while preventing longer wavelength heat rays from passing through this glazing.

According to the invention, a suitable polyethylene glycol phase change material of the desired characteristics is disposed in a fluid-tight container having front and back surface areas transparent to sunlight, said front surface area being adapted to receive solar energy. For example, based upon diurnal temperature fluctuations in buildings, the equivalent active thermal capacity of the polyethylene glycol, as described above as compared with water in the "Transwall" is approximately one-sixth by volume. Therefore, a one-centimeter thick layer of this polyethylene glycol is more than adequate for providing equivalent performance, and the weight is only 2.34 pounds per square foot for the polyethylene glycol alone, as compared with 10.4 pounds per square foot for the five-centimeter thick water filling in "Transwall".

The fluid-tight container having the polyethylene glycol disposed therein is placed in proximity to at least one transparent glazing in sheet form which is separated from the container by an air space and is positioned to face the incoming solar radiation and permit the solar radiation to pass through the transparent glazing sheet to the front transparent surface area of the fluid-tight container, whereby over a time the solid polyethylene glycol absorbs solar energy and changes to a liquid. The transparent glazing in sheet form has an outer surface disposed toward incoming solar radiation and an inner surface disposed closer to the front transparent surface area of the fluid-tight container. This glazing preferably includes a layer of insulation on its inner surface which transmits short wavelength solar rays while preventing longer wavelength heat rays from radiation through the glazing. In preferred embodiments of the invention there are two layers of transparent glazing positioned between the incident solar radiation and the transparent container which holds the phase change material.

Other aspects of the invention will be made clear or become apparent from the following description and claims when read in light of the accompanying drawings, wherein:

DETAILED DESCRIPTION OF THE INVENTION

The phase change material employed as the heat storage medium in the solar heating units of this invention is polyethylene glycol characterized by heat of fusion of about 33 to 37 calories per gram (4,170 to 4,670 Btu's per cubic ft.), a melting point of about 13° C. to 25° C. (55° F. to 77° F.), a specific gravity of about 1.125 at 20° C., and isotropic freezing and melting characteristics with only a very modest increase in volume or less than 2% during phase change from solid to liquid. Polyethylene glycol of the described characteristics is particularly advantageous for use in the solar heating units of this invention because this phase change material changes from a solid to liquid in a very narrow temperature range closely corresponding to the desired temperature of a room or enclosed space (living or working space) to be heated. Thus, there is a close coupling between the desired air temperature in the room or enclosed space to be heated and this phase change material for stabilizing and closely regulating the living or working space temperature of such space to be heated. Furthermore, the polyethylene glycol does not exhibit corrosive effects, nor stratification, nor segregation, nor precipitation, such effects as occur with conventional water soluble salts that have been proposed by others for thermal storage. In addition, the polyethylene glycol is characterized by a highly desirable low level (2% or less) of volumetric expansion/contraction over the liquid-solid transition range (phase change range). Furthermore, the polyethylene glycol is advantageously transparent when liquid and translucent when solid.

Especially preferred for use as the phase-change material for use in this invention is the polyethylene glycol known as polyethylene glycol 600 having a heat of fusion of approximately 35 cal./gm. (63 Btu's/lb.) during change of state from solid to liquid within a temperature range of about 13° to 25° C. (55° to 77° F.). Most especially preferred would be a polyethylene glycol having a heat of fusion of approximately 35 cal./gm. and having a melting temperature of from about 20° to 22° C. (68° to 70° F.). The polyethylene glycol employed in this invention exhibits only a small change in volume during its change in state, so that only a relatively small amount of trapped air in each fluid-tight container of the modular solar energy heating unit provides resilience to accommodate expansion/contraction of the polyethylene glycol for preventing rupture of the fluid-tight container in which this polyethylene glycol is held. A suitable polyethylene glycol for use in this invention is, for example, polyethylene glycol 600 sold by the Union Carbide Corporation, of New York, N.Y. under the trademark CARBOWAX.

The fluid-tight container in which the polyethylene glycol is contained can be any suitable fluid-tight container having at least one surface area (the front surface area) transparent to sunlight. In a preferred embodiment of this invention the fluid-tight container will be clearly optically transparent on both front and rear surfaces for allowing illumination to ente the enclosed living or working space and for enabling a viewer in the enclosed space to see clearly through this container when the polyethylene glycol is in its clear, transparent high-stored-energy liquid state. The container can be formed in any desired shape, such as a tube, a vacuum formed panel, a framed window or wall structure or the like. Any transparent material which permits the solar rays to pass therethrough is suitable for forming the fluid-tight container for holding the polyethylene glycol. As examples of suitable materials, there are many to be mentioned, for example, transparent glass, polyvinyl chloride, polyvinyl butyrate, polycarbonate, acrylics, polyacrylates, polyesters, and the like.

Likewise, the clearly optically transparent glazing material in sheet form employed in the solar units of this invention can also be formed of any transparent material which permits solar rays to pass therethrough such as the material referred to hereinbefore as suitable for forming the fluid-tight container. However, the preferable transparent glazing material in glass.

Transparent insulation material suitable for placing on the rear (inner) surface of the transparent glazing can be any suitable transparent insulation material which transmits short wavelength solar rays while preventing longer wavelength heat rays from radiating through the glazing. As an example of such a suitable transparent insulation material, there may be mentioned for example the product Heat Mirror transparent insulation sold by the Southwall Corporation, of Palo Alto, Calif. The Heat Mirror product transmits solar radiation but blocks heat radiation by reflecting the heat rays. Other examples of transparent insulation glazing material are: "SUNGATE" Glass from PPG Corporation of Pittsburgh, Pa.; or glass for minimizing longer wavelength heat loss made by Pilkington Glass Works and commercially available in England.

In operation, the modular solar energy heating unit of this invention operates as follows. During the day, sunlight in the form of solar radiation passes through the transparent glazing sheet or sheets and the transparent insulation on the rear surface thereof and impinges on the front transparent surface area of the fluid-tight container holding the polyethylene glycol phase change material. As the solar rays pass through the transparent surface area of the container and otherwise strike the container walls, the translucent, milky-white solid polyethylene glycol in the container melts and stores energy as latent heat of fusion without appreciable rise in temperature of the phase change material. During the evening and night when the sunlight is no longer present, the phase change material gives off its heat to the surroundings as the melted material freezes releasing the stored energy. The transparent insulation on the transparent glazing sheet prevents undue loss of thermal energy by preventing heat radiation from radiating through the glazing.

The modular solar energy heating units of this invention can be employed in a multitude of environments to heat an enclosed space for living or working. For example, a heating unit of this invention may be placed in a transparent wall, a transparent roof or window, or may be removably or interchangeably mounted on tracks, racks or clips in a sunlight impingement area of a room or other enclosed space to be heated. By the term "an enclosed space to be heated" is meant any substantially enclosed area where regulation of the temperature is desired for human comfort, such as for example, a room, a hallway, or corridor, or other living space, a warehouse, factory, office or other work area. The units are capable of assembly in a multitude of building types, building locations and a variety of applications where absorption of solar energy for subsequent release of thermal energy is desired. Those skilled in the art will readily appreciate the various applications for such a solar heating unit. For example, a unit of this invention can be assembled as part of a transparent/translucent office wall or partition.

In association with a corridor or porch along the south side of a building, a heating unit of this invention is superior to glazing alone protected by reflective blinds or by solar control film (e.g. "Scotchtint" solar control film from 3M Corporation, of Minneapolis, Minn.) in that in employing the present invention the solar energy is stored and subsequently is advantageously utilized for heating, rather than throwing it away into the exterior ambient as occurs to considerable extent with reflective blinds or solar control film.

The solar heating units of this invention are highly effective solar energy heating units due to the design thereof and the particular materials of construction. Furthermore, such solar heating units are lightweight and space saving and are low cost per Btu stored. Additionally, such units are easily produced, inexpensive and capable of mass production by known techniques; except that sealant, if any, in contact with the phase change storage material must be unaffected thereby.

Figure 1:
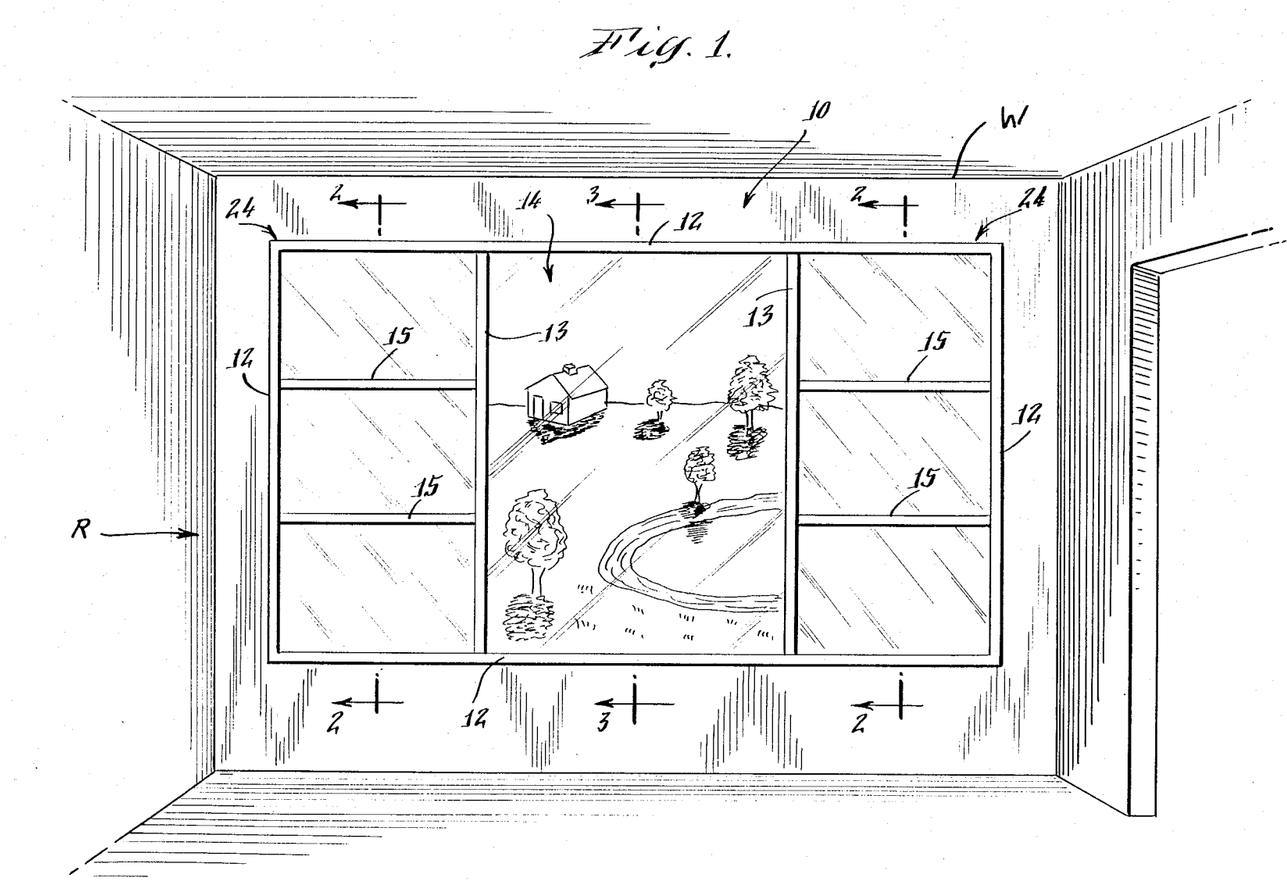
FIG. 1 is a perspective view of a wall with a modular solar panel constructed according to the invention placed therein.
Figure 2:
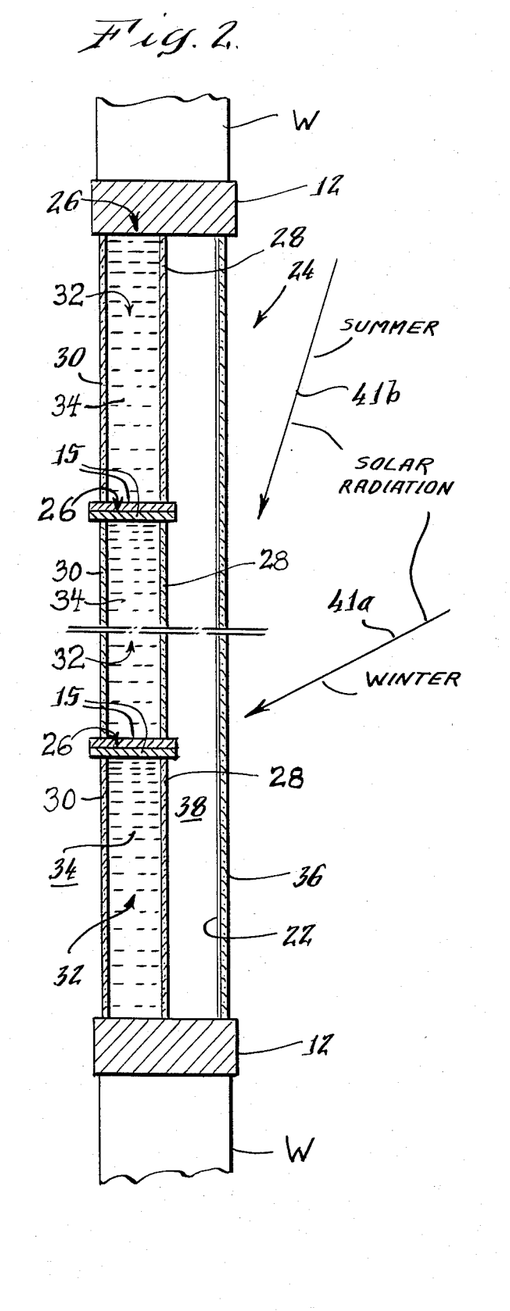
FIG. 2 is a vertical cross-sectional view taken along the line 2—2 of FIG. 1.
Figure 3:
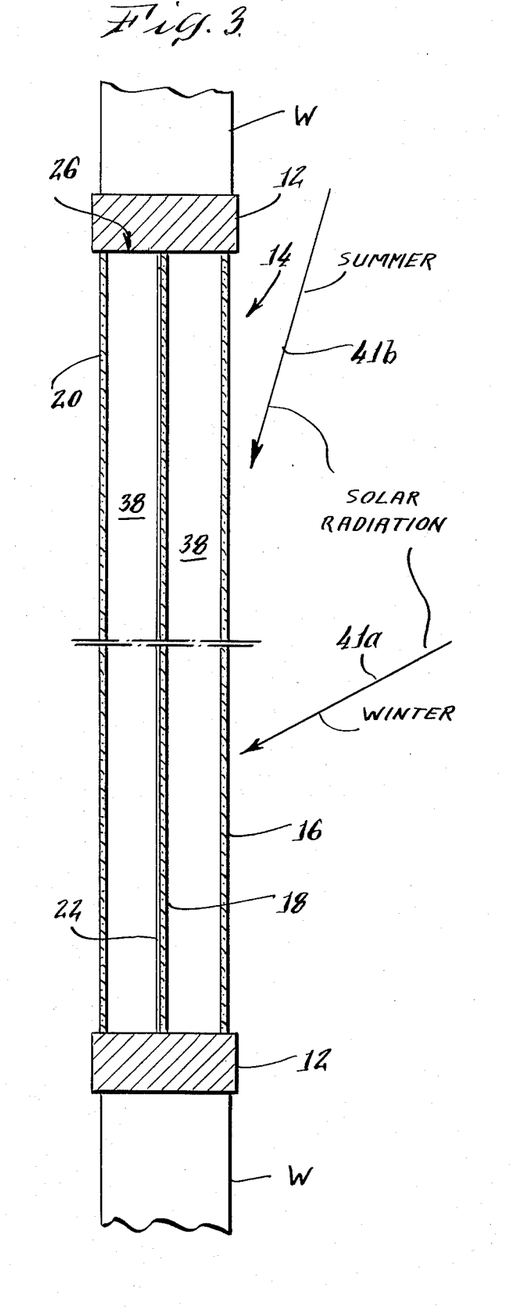
FIG. 3 is a vertical cross-sectional view taken along the line 3—3 of FIGS. 1 and 4.

Exemplary embodiments of the solar heating units of the present invention are set forth in the drawings. Referring to FIGS. 1-3, a modular solar energy heating unit of this invention is shown as a component part of a window unit of a building or room. A window indicated generally by the numeral 10 is disposed in the south facing wall W of an enclosed space or room, indicated generally by R, of a building. In this exemplary form, the window unit 10 comprises a peripheral frame 12 including a pair of mullions 13 having disposed therein a central, triple-glazed (FIG. 3), transparent viewing region or window area 14, preferably of glass, including an outer sheet 16, an intermediate sheet 18, and an inner sheet 20, each of transparent glazing material.

As shown in FIG. 3, the transparent viewing surface 14 has a layer of transparent insulation 22 disposed on the inner face of the intermediate sheet 18. It will be appreciated, however, that said transparent insulation material 22 can be place on the inner side of the outer sheet 16 or the inner side of the inner sheet 20, wherein the term "inner side" refers to the side facing the enclosed space R. It will be appreciated that although it is possible to place the transparent insulation layer 22 on the inner side of the sheet 20, this is not as desirable as being on the inner side of the sheet 18 or 16, because the transparent insulation layer is then exposed to damage by contact with persons or objects or possibly by damage from exposure to the atmosphere. The preferred location in the case of a triple-glazed window 14, as shown, is to place the insulation layer 22 on the inner side of the intermediate sheet 18, as shown.

In planar neighboring relationship to said central window area 14 and on opposite vertical sides of the mullions 13 are a pair of identical modular solar energy heating units 24. The modular solar heating units 24 each comprises three vertically extending, rectangular fluid-tight containers 26 (FIG. 2 or FIG. 2A) mounted one above another. Each of the solar heating units 24 is formed by two spaced, parallel, clearly optically transparent sheets of glazing 28 and 30 and bounded on its perimeter by portions of the frame 12 and by one of the mullions 13, and by a horizontal rail 15 or rails 15. The sheets of glazing 28 and 30 are separated by a region 32 filled with polyethylene glycol phase change material 34. On the outer side of the container 26 and in spaced, parallel, planar relationship thereto is another clearly optically transparent glazing sheet 36 (FIG. 2) having on its inner surface and facing toward container 26 a layer of transparent insulation 22. The space 38 between the insulation layer 22 and the containers 26 is filled with air or any other suitable gas insert to the insulation layer 22.

In operation as shown in FIG. 2 during daylight hours when solar radiation 41a and 41b is available, this solar radiation passes through the transparent glazing 36, insulation layer 22, space 38 and the transparent sheet 28, whereby it melts the polyethylene glycol 34 in container 26, thereby storing latent heat of fusion in the liquid phase change material.

Figure 1A:
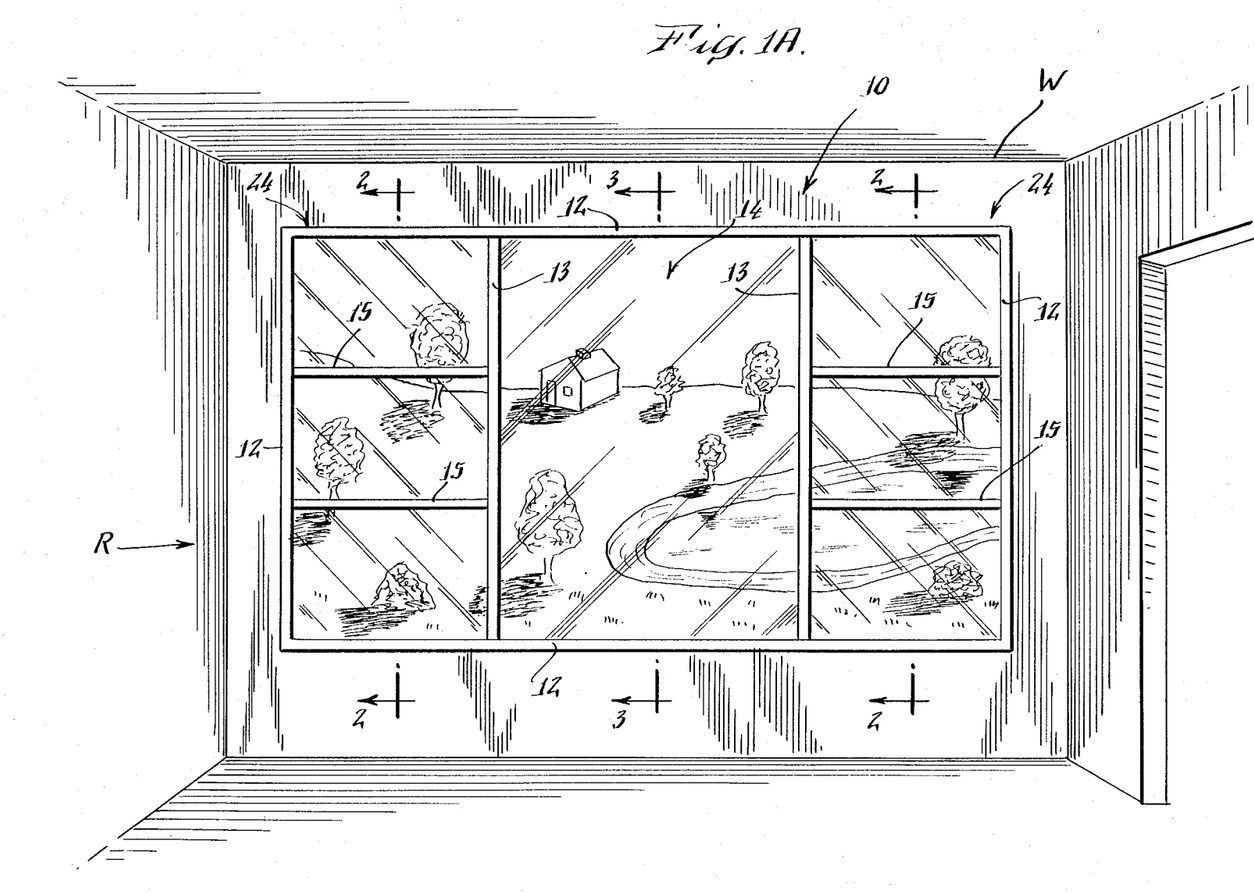
FIG. 1A is a similar view after the solar energy heating units have become clearly optically transparent as a result of phase change due to storage of solar energy.

Advantageously, when the early morning sunlight illuminates the storage units 24, the polyethylene glycol phase change material 34 is solid, thus being translucent, milky white. Consequently, the units 24 thus provide a diffuse, pleasant illumination into the room R as seen in FIG. 1, while the viewer can see through the central viewing area 14. As this phase change material 34 absorbs the solar energy, it changes into a clearly transparent liquid. Consequently, the units 24 on either side of the central viewing area attractively begin to become clearly transparent, thereby expanding the clearly transparent viewing area to include portions of these two units 24. At last, when all of the phase change material 34 has become liquid from absorbing solar energy, the clearly transparent viewing area of the window 10 will have attractively expanded and spread out to the full size defined with in the frame 12, as shown in FIG. 1A.

When the solar radiation is interrupted, such as at night, the liquid phase change material 34 begins to solidify, thereby releasing its latent heat of fusion as thermal energy which is conducted through transparent sheets 28 and 30 and is radiated as relatively long wavelength thermal radiation from these sheets 28 and 30. Radiation of thermal energy to the outside of the enclosed space is prevented or substantially reduced by the insulation layer 22. However, thermal energy radiated from the sheet 30 into the space or room R is desirably available for heating this enclosed space or room.

Figure 2A:
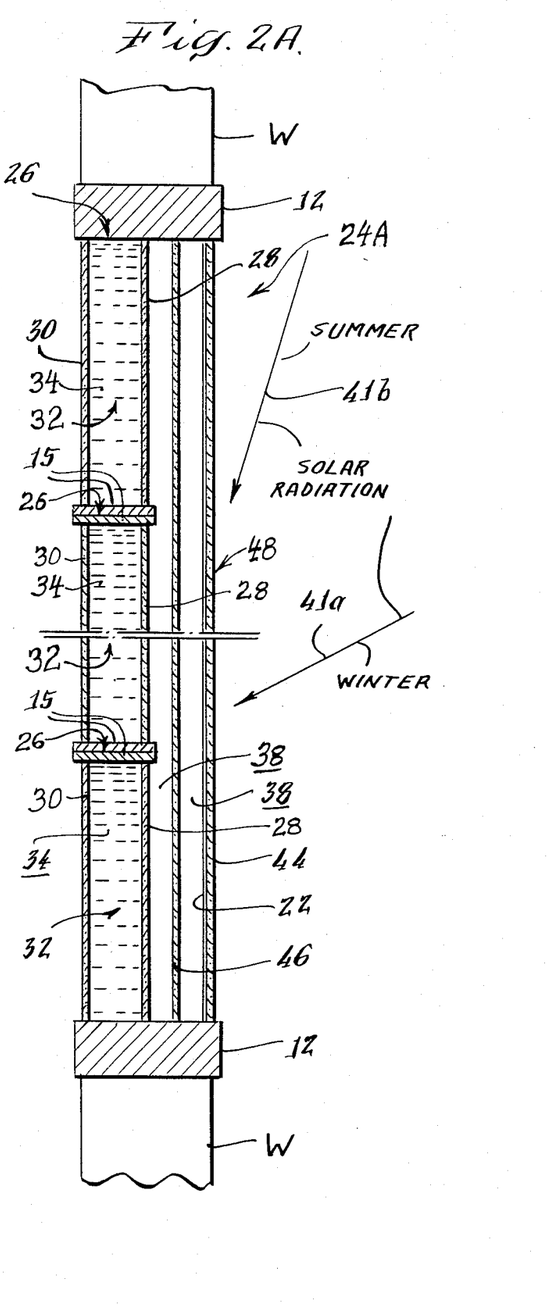
FIG. 2A is a vertical cross-sectional view of a structure which is thermally similar to FIG. 2.

In FIG. 2A is shown a modified solar heating unit 24A in which the single clearly optically transparent glazing sheet 36 in the unit 24 of FIG. 2 is replaced by two clearly optically transparent glazing sheets 44 and 46 with the space 38 between them being filled with air or other suitable gas which is inert with respect to the insulation layer 22. The other parallel space 38 between the inner glazing 46 and the outer sheet 28 of the units 26 is filled with air or other suitable inert gas.

In FIG. 2A when the insulation layer 22 is present, as shown, the thermal performance of the thermal storage heating unit 24A is superior to the unit 24 of FIG. 2.

When the insulation layer 22 is omitted from the inside surface of the outer glazing sheet 44, then the double-glazed unit 24A, including two trapped air (or gas) spaces, is thermally approximately equivalent to the single-glazed unit 24 (FIG. 2) including one trapped air (or gas) space 38 plus the insulation layer 22.

In FIG. 3, it is to be understood that the spaces 38 between the respective glazing sheets 16, 18 and 20 are filled with air or any other suitable gas inert to the insulation layer 22.

Figure 4:
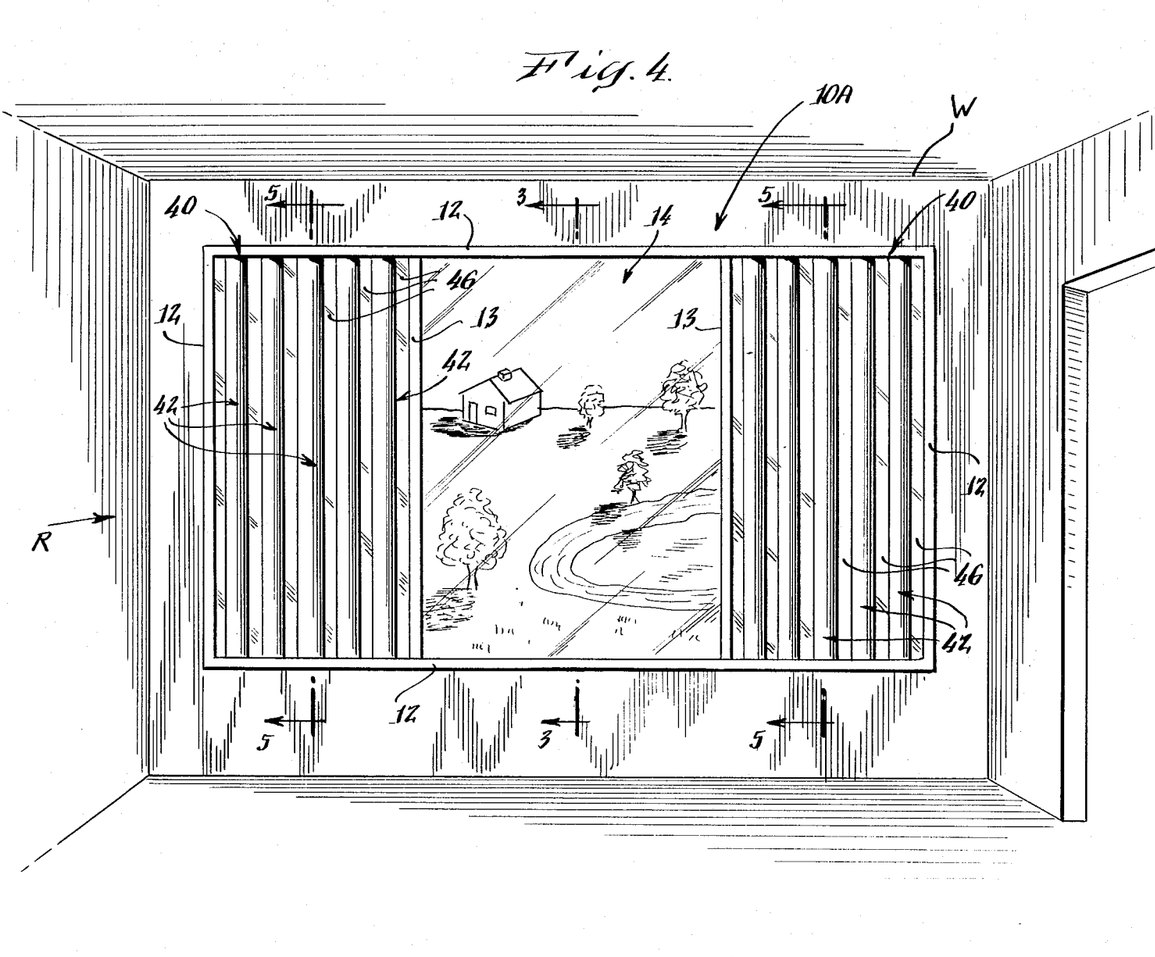
FIG. 4 is a perspective view of a wall with another embodiment of a modular solar panel constructed according to the invention placed therein.
Figure 5:
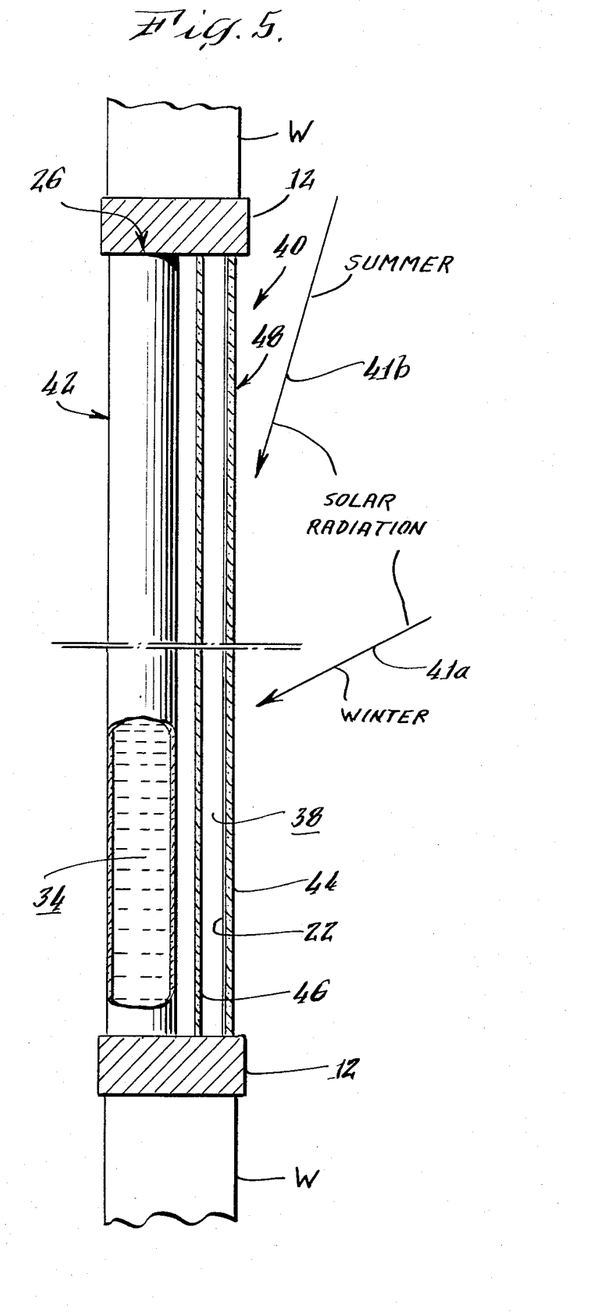
FIG. 5 is a vertical cross-sectional view taken along the line 5—5 of FIG. 4.

A further embodiment is disclosed in FIGS. 3, 4 and 5 wherein a modified form of modular solar energy heating units 40 are shown as component parts of a window unit of a building or room. A window unit, indicated generally by the numeral 10A, is disposed in the south-facing wall W of an enclosed space or room R of a building. The window unit 10A comprises a peripheral frame 12 including a pair of mullions 13 having disposed therein a central triple glazed viewing region or window area 14 (FIG. 3) preferably of glass, having an outer 16, intermediate 18 and inner 20 sheet of clearly optically transparent glazing material. As shown in FIG. 3, the transparent viewing region 14 has a layer of transparent insulation 22 disposed on the inner face of the intermediate sheet 18.

In planar neighboring relationship to the central viewing area 14 and on opposite vertical sides of the mullions 13 are a pair of identical modular solar energy heating units 40. The modular solar units comprise a plurality of parallel planar arranged, spaced-apart, fluid-tight clearly optically transparent tubular containers 42 filled with the polyethylene glycol phase change material 34 (FIG. 5). On the outer side of the containers 42 between them and the direction of solar radiation and in spaced, parallel, planar relationship thereto are two spaced apart, vertical, parallel transparent glazing sheets 44 and 46 which may be the panes of a conventional double glazed window 48. On the inner face of the outer sheet 44 there is shown disposed in co-extensive overlapping relationship thereto a layer of the transparent thermal insulation 22. The space 38 between layer 22 and sheet 44 is filled with air or other suitable gas inert to layer 22. This window 48 is mounted in the same frame 12 with the tubular containers 42.

Figure 6:
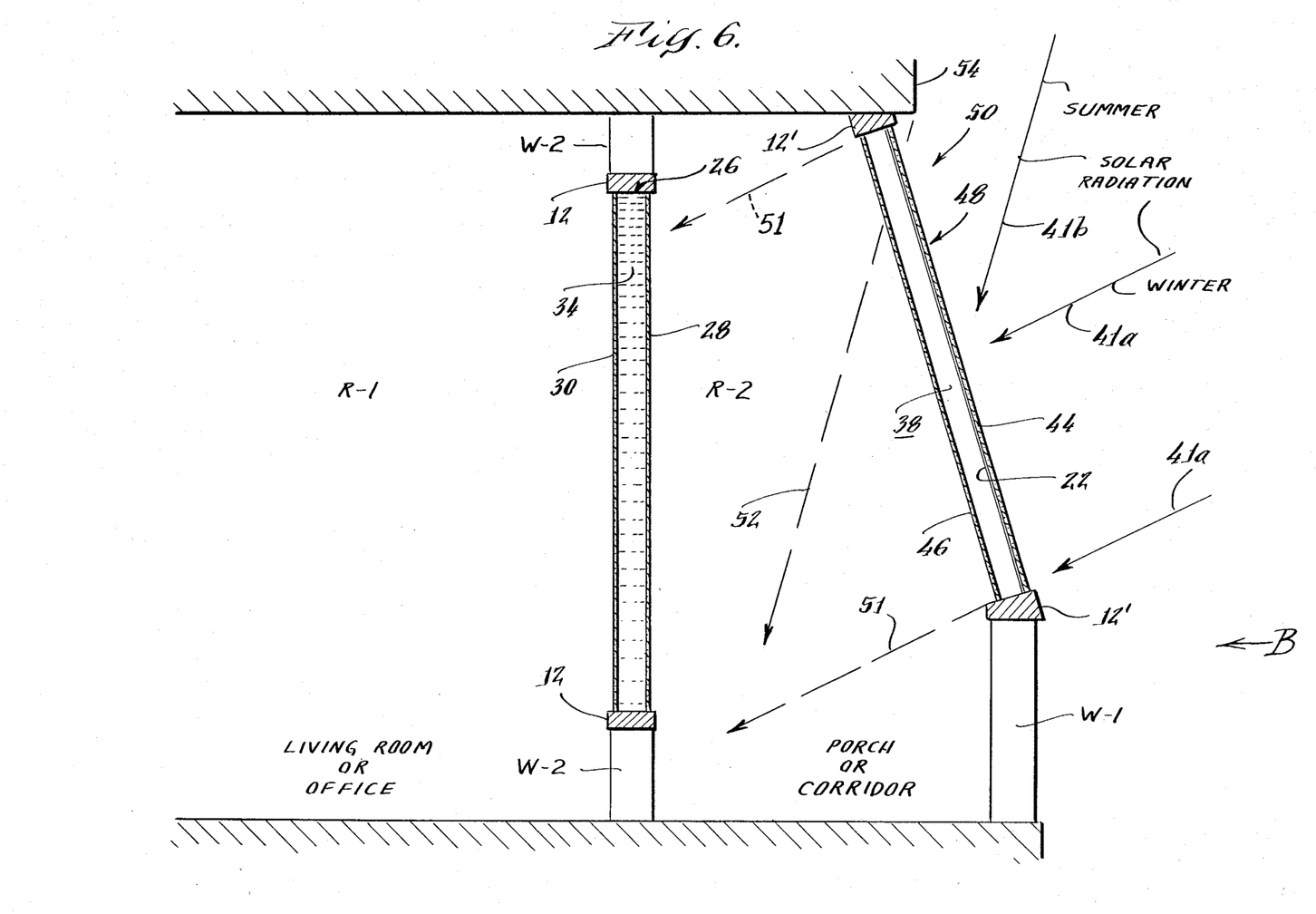
FIG. 6 is a vertical cross-sectional view showing details of another embodiment of a modular solar heating unit of this invention in two nearby walls of an enclosed space to be heated.

Another embodiment of a modular solar energy heating unit 50 of this invention and its use is shown in FIG. 6 where the heating units serves to simultaneously heat the enclosed spaces R-1 and R-2 on both the inner and outer side of the fluid-tight container portion 26 of the unit 50. In a building, generally indicated by B, there is an outer south-facing wall W-1 and a spaced apart inner wall W-2 separated by an enclosed space, for example such as a porch, corridor or the like. In the exterior wall W-1, there is placed in a position situated so as to receive solar radiation a double-glazed transparent aperture or window 48 having an outer pane 44 and an inner pane 46, each of clearly optically transparent glazing material. On the inner face of pane 44, there may be disposed in a co-extensive overlaying relationship thereto a layer 22 of the transparent thermal insulation described above. The space 38 between layer 22 and pane 46 is filled with air or other suitable gas inert to the insulation layer 22.

In the internal wall or partition W-2, there is placed a fluid-tight, rectangular, transparent container 26 filled with polyethylene glycol phase change material 34. In the embodiment shown in FIG. 6, the container 26 is formed by a pair of strong, vertical, parallel, spaced apart clearly optically transparent sheets 28 and 34 mounted in a frame 12 in the wall 12. This container 26 is similar to the container 26 shown in FIGS. 2 and 2A.

If it is desired that the fluid-tight container 26 be sufficiently large to comprise the major area of the internal wall or partition W-2, then the container sheets 28 and 30 are externally braced with vertical and/or horizontal stiffening members (not shown) for supporting these sheets against the outward spreading forces upon them due to the hydrostatic pressure of the liquid phase change material 34 between them.

Alternatively, instead of using such stiffening braces, the large container in the wall or partition W-2 (FIG. 6) may comprise a plurality of smaller containers 26, for example each one being only 2 feet tall, arranged one above another, with horizontal rails 15 between them, as shown in FIGS. 2 and 2A. It is to be understood that in FIGS. 2 and 2A each of the container units 26 is individually fluid tight and self-contained. Thus, for example if each of the containers 26 is two feet tall, a thermal storage unit 24 or 24A (FIG. 2 or 2A) which is approximately six feet tall is assembled by stacking up three of the containers 26 vertically aligned one above another. The horizontal rails 15 at the top and bottom of the respective container units 26 are appropriately secured together, for example by bolts, clamps or machine screws (not shown) to complete the assembly.

In FIG. 6 the container 26 (or containers 26) in the wall or partition W-2 provide desirable translucent illumination into the enclosed living or work space R-1 when the phase change material 34 is solid and enables occupants of the space R-1 to look through the thermal storage container(s) 26 into the enclosed space R-2 and also to look out through the window 48, when the material 34 is in its high-stored-energy liquid state.

The solar thermal energy heating unit 50 includes the fluid-tight container(s) 26 together with the double-glazed window 48 which may be similar to the window 48 in FIG. 5 and in FIG. 2A. As shown in FIG. 6, the window 48 is mounted in a frame 12' and is inclined at an angle to the vertical in the range from 15° to 40° in order to place the panes 44 and 46 approximately perpendicular to the low angle mid-winter solar radiation 41a for achieving maximum transmission of the solar energy onto the outer transparent surface area 28 of the container 26. In this example the window 48 is inclined 17° from the vertical, and substantially the entire area of the outer sheet 28 of the container 26 is bathed in solar radiation 41a transmitted by the inclined window 48 during the mid-winter months, as shown by the dashed arrows 51. However, as shown by the dashed arrow 52, the portion 54 of the building B prevents the summer solar radiation 41b from reaching the container 6, thereby avoiding over-heating of the enclosed space R-1. It is to be understood that the window 48 in FIG. 6 may be vertical, if desired.

In operation, the solar energy unit 50 (FIG. 6) is identical to the units 24, 24A and 40 as described in that solar radiation enters the building through the south-facing window 48 and strikes the transparent surface 28 of the container 26 melting the polyethylene glycol 34 therein and storing latent heat of fusion in the process. Upon interruption of the solar radiation, the liquid polyethylene glycol begins to freeze, releasing its latent heat of fusion as thermal energy conducted through the transparent surfaces 28 and 30 and being radiated therefrom. Thermal energy radiates from both sheets 28 and 30 of container(s) 26 for warming both the porch or corridor R-2 and the living room or office R-1 on opposite sides of the container. Thermal insulation layer 22 prevents or inhibits to a substantial extent any loss of thermal energy through window 48 by blocking or reflecting thermal radiation from containers 26 back into the enclosed space R-2.

Figure 7:
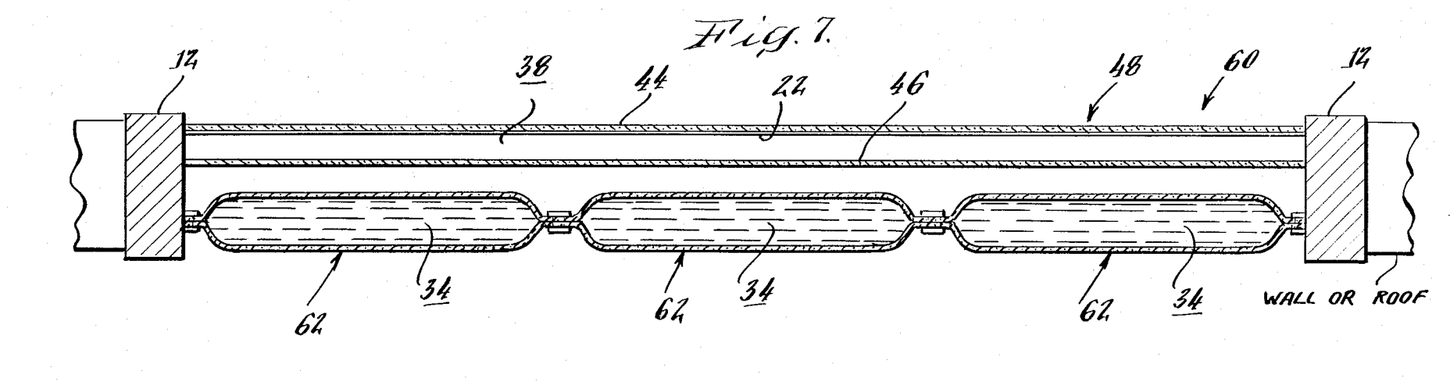
FIGS. 7 and 8 are sectional views of two other embodiments of a modular solar heating units of this invention.

Another embodiment of a modular solar energy heating unit of this invention is disclosed in FIG. 7. The heating unit is designated generally by the numeral 60, and comprises a peripheral frame 12 which supports a plurality of suspended, vacuum-formed, fluid-tight, clearly optically transparent containers 62. Each of the containers 62 includes a pair of vacuum-formed, tray-like panels of clearly optically transparent material, each panel having a peripheral rim displaced out of the plane of the main body of the panel. The pair of panels have their rims secured together to form the container 52. Two parallel, spaced apart, transparent glazing sheets 44 and 46 are positioned in frame 12 in spaced overlaying relationship to the containers 62. The two parallel glazing sheets comprise an inner sheet 46 closest to containers 62 and an outer sheet 44. On the inner face of sheet 44 facing toward the sheet 46 there may be a layer 22 of transparent thermal insulation as described above. The unit 60 shown in FIG. 7 is suitable for placing in a wall, partition, roof or like structure, of an enclosed space in a manner such that the outer transparent sheet 44 faces the incoming solar radiation.

The double-glazed window 48 in FIG. 7 may be similar to the windows 48 in FIGS. 2A, 5 and 6. The containers 62 are manufactured from any vacuum-formable, clearly optically transparent plastic sheet material which will permit the solar radiation to pass therethrough.

Figure 8:
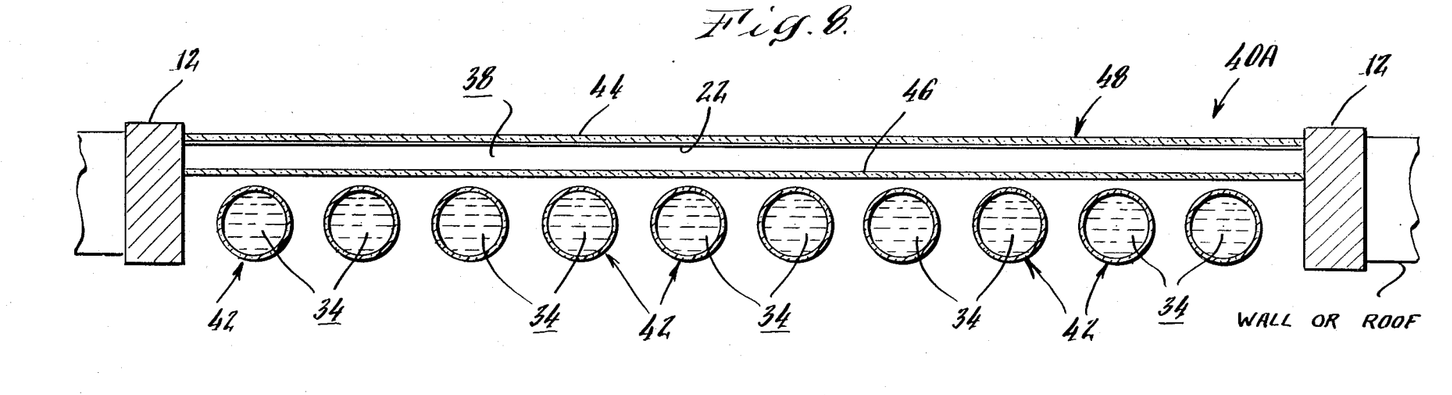

A further embodiment of a modular solar energy heating unit 40A embodying this invention is shown in FIG. 8. The unit 40A is similar to one of the units 40 in FIGS. 4 and 5 and is suitable for placing in a wall, partition, roof, or like structure, of an enclosed living or work space in a location for incoming solar radiation to pass through the outer clearly optically transparent double-glazed window 48 into the fluid-tight tubular containers 42 of the phase change material 34. The double-glazed window 48 in FIG. 8 may be similar to the double-glazed window 48 in FIGS. 2A, 5, 6 and 7.

It is to be understood that the air or inert gas in the spaces 38, as shown in the various FIGURES, is dry so that moisture condensation cannot occur. As used in the claims herein, the term "gas" is intended to be sufficiently broadly interpreted to include a mixture of gases, for example such as air, which is a mixture primarily of nitrogen and oxygen.

Turning attention back to FIGS. 2 and 2A, it will be appreciated that the planar fluid-tight containers 26 can be supplied as modular units for use in retrofitting into existing windows for converting the window from a conventional window into a passive solar energy heater. The modular retrofit passive solar energy heating unit 26 includes spaced parallel outer and inner clearly optically transparent planar glazing sheets forming surface areas 28 and 30, respectively, with a bordering frame 13 and 15 encircling these two surface areas for holding them in spaced parallel relationship and for sealing the unit to render it fluid-tight. The region between these two transparent surface areas 28 and 30 is essentially filled with polyethylene glycol phase change storage material 34 having the advantageous characteristics as described above. In a preferred embodiment of the retrofit unit this phase change material 34 is approximately one centimeter thick (approximately 0.4 of an inch thick).

The bordering frame of the retrofit solar heater 26 is shaped to fit snuggly into the interior margin of the existing window frame 12. In the case of tall retrofit heater units 26 in order to minimize the hydrostatic pressure occurring between the transparent surface areas 28 and 30 due to gravitation acting on the polyethylene glycol 34, the frame of the unit includes one or more horizontal frame members 15 which separate the unit into separate fluid-tight compartments 32 arranged one above another. For example, in the case of a window four feet high the retrofit heater unit includes two separate fluid-tight compartments 32 one above the other in vertical planar relationship and each being approximately two feet high and each being essentially filled with the phase change material 34. Similarly, in the case of a window six feet high, the retrofit heater unit includes three of such separate fluid-tight compartments 32 arranged one above another in vertical planar relationship. For the majority of retrofit solar heater units, it is preferred that the compartment region 32 between the respective outer and inner planar transparent glazing sheets 28 and 30 not exceed a height of 2.5 feet in order to keep the hydrostatic pressure moderate. However, in the case of tall narrow retrofit solar heater units the vertical frame members serve to support and stiffen the glazing sheets 28 and 30, in which case the fluid-tight compartment region 32 may be taller than the preferred height of 2.5 feet.

Although an advantageous solar heating benefit is obtained when retrofit solar heater units 26 are fitted into the interior of windows having only a single glazing sheet 36 (FIG. 2), the preferred installation is to fit such solar heater units into the interior of double-glazed windows (FIG. 2A). Placement of such solar heater units into a double-glazed window is preferred, because the overall economic return to the user in saving heating fuel costs is considerably greater.

Advantageously, a dye soluble in the polyethylene glycol phase change material 34 may be included in the foregoing embodiments of this invention. This dye increases the ability of the translucent material 34 to absorb energy from incident solar radiation when the material is in its translucent state. Thus, its milky while translucent appearance is changed to a particular tint or lighter or darker color as may be desired by the architect or owner for aesthetic effect. The concentration and color of the respective dye to be added may be specified for achieving a particular color coordinated appearance for the various window heating units in the building.

The phase change material 34 when in its milky matte white translucent state has an absorptivity of about 40% for incident solar radiation. Adding a dye as described increases this absorptivity. An increase in absorbtivity is important on non-opportune or non-ideal days, in other words, on cloudy or overcast days.

Another advantage of adding a soluble dye is to moderate the ambient glare of the window heating unit on bright sunny days when the phase change material 34 has become transparent. The pleasant tint or color shading remains in the transparent container. The resultant tint or color shading of the dyed phase change material reduces the penetration of sunlight directly into the heated space, thereby minimizing any overheating. Thus, light and heat control advantages, plus aesthetic enhancement are provided by adding such a dye.

Further, the glass glazing forming the container for the dyed phase change material 34 can be clear, rather than being tinted glass. Clear glass is less expensive, for example, than bronze colored glass. Moreover, bronze glass tends towards thermal cracking when hotter than its surroundings. In certain buildings for aesthetic reasons and/or interior light intensity control purposes and for increasing the absorbing of solar energy, it may be desirable that the inner transparent surface area 30, which faces the enclosed space to be heated R or R-1 and which is adjacent to the phase change material 34, may be tinted glass glazing, for example, tinted grey, bronze or green, and such tinted glass glazing 30 may be used regardless of whether or not the phase change material 34 contains any dye.

In addition, there is the tint and color customizing advantage for aesthetic effect at a particular building site. It is not practical to customize the color or tinting of window glass, except in the case of very large building installations where the added increment of cost for specialized glass manufacture can be spread over a large economic entity. In contrast to specialized color glass production, all of the containers for the phase change material 34 are made of standard clear glass. Then, the tint and color customizing is economically achieved by using a stable soluble dye. There are a myriad of stable dyes available which are soluble in this phase change material 34.

EXAMPLES OF SUITABLE DAYS

Brown—Color Index Solvent Brown No. 12 Common Name—Bismarck Brown, available from Ciba Geigy, S.A., of Basle, Switzerland Grey—Color Index Solvent Black No. 1 A monazo dye not having any common name, available from Ciba Geigy, S.A. of Basle, Switzerland Blue—Color Index Solvent Blue No. 19 An Anthraquinone dye. Common Name—Oraset Blue B, available from Ciba Geigy, S.A., of Basle, Switzerland.

Green—Color Index Solvent Green No. 3 An Anthraquinone dye Common Name—Sudan Green 4B, available from GAF Corporation, New York City, N.Y.

The above dyes are described in the Third Edition of the Color Index, published by the Society of Dyers and Colorists.

In the event the construction of the containers 26 or 62 or the construction of the compartment regions 34 requires use of a sealant in contact with the phase change storage material 34 such sealant must be unaffected thereby. For example, silicon sealant is suitably unaffected thereby.

The term "south-facing" as used herein is intended to be broadly interpreted to include any area oriented generally facing southerly; that is, within the 90° compass range from South East to South West (true directions, not magnetic directions). It is out preference for superior results that the south-facing area be oriented within the 45° compass range from South South East to South South West.

As used herein, the term "heat rays" or "longer wavelength heat rays" is intended to mean the relatively long wavelength (as compared to the wavelength of visible light) electromagnetic radiation which radiates from objects at comfortable room temperature and from human beings.

As used herein, the phases "optically clear", "clearly optically transparent", "optically transparent", and "transparent", as applied to "glass", "glazing", "glazing surface", "glazing sheets", "glazing material", "surface area", "surface areas", "insulation layer" and "material" are intended to mean such glass, glazing, glazing surfaces, glazing sheets, glazing materials, surface areas, insulation layers, and material as allow a viewer to look through them and see objects outside of a building clearly during daytime and are intended to be interpreted sufficiently broadly in context with the present specification to include them when they are colorless and to include them when they are tinted.

The same respective reference numerals are used to indicate corresponding elements, i.e. elements performing the same or similar functions, throughout the various FIGURES.

From the foregoing, it will be appreciated that the embodiments and description provided are merely exemplary and that various embodiments and modifications thereof will be apparent to those skilled in the art and are within the contemplation of the invention.

We claim:

1. A modular passive solar energy heating and outdoors viewing unit adapted to absorb and store solar energy and subsequently release said solar energy as thermal energy in an enclosed space comprising:

a fluid-tight rigid container member having two opposite surface areas clearly optically transparent and adapted to receive solar energy, solar energy heat storage phase change material disposed in said container, said phase change material being polyethylene glycol characterized by a heat of fusion of about 33 to 37 ca./gm (4,170 to 4,670 Btu's per cubic ft.), a melting point of from about 13° to 25° C. (55° to 77° F.) and a specific gravity of approximately 1.125 at 20° C., said phase change material in said fluid-tight container member being translucent milky white when in its low-stored-energy solid state and being clearly optically transparent to visible light when in its high-stored-energy liquid state for enabling a viewer to look through said container member, clearly optically transparent glazing in sheet form having an inner and an outer side, said transparent glazing being separated from said fluid-tight container member, and being positioned so as to permit solar radiation to pass through the glazing to a transparent surface area of the fluid-tight container member, the outer side of said glazing being disposed to face incoming solar radiation, said inner side of said glazing facing toward said transparent surface area of the fluid-tight container member, said inner side of the glazing being separated from said transparent surface area of the fluid-tight container member by a gas space, said glazing transmitting short wavelength solar and visible light rays while preventing longer wavelength heat rays from radiating through the glazing, said glazing being positioned on the opposite side of said fluid-tight container member from said enclosed space, whereby when said phase change material is in its low-stored-energy solid state said fluid-tight container member presents a back-illuminated milky white appearance to a viewer in said enclosed space, and whereby when said phase change material is in its high-stored-energy liquid state a viewer can see through said fluid-tight container and through said glazing.

2. A modular passive solar energy heating unit as claimed in claim 1, in which:

said glazing prevents longer wavelength heat rays from radiating through itself by having a reflective insulation layer which reflects the longer wavelength heat rays, said reflective insulation layer being clearly optically transparent.

3. A modular passive solar energy heating and outdoors viewing unit as claimed in claim 1, in which:
the inner surface area of said container facing toward said enclosed space is tinted.

4. A window unit for a wall or roof of an enclosed space wherein:
said window unit comprises within a window viewing framing structure a central, multiple glazed, transparent viewing surface, and in planar relationship thereto and on at least one side of said central viewing surface, a modular passive solar energy heating unit of claim 1.

5. The window unit of claim 4, wherein:
said central, multiple glazed, viewing surface comprises an inner glazing surface adapted to face an enclosed area to be heated, an outer glazing surface adapted to face incoming solar radiation and an intermediate glazing surface between said inner and outer glazing surfaces, said intermediate glazing surface having disposed thereon in a manner coextensive therewith a transparent insulation means which transmits short wavelength solar rays while reflecting longer wavelength heat rays for preventing them from radiating through said intermediate glazing surface.

6. The modular passive solar energy heating unit of claim 1, wherein:
there are a plurality of fluid-tight container members placed and adapted to absorb solar energy passing through the transparent glazing in sheet form.

7. The modular passive solar energy heating unit of claim 6, wherein:
the plurality of fluid-tight container members are mounted in an exterior wall of an enclosed space to be heated and said transparent glazing in sheet form is mounted in an exterior wall of said enclosed space to be heated.

8. A modular passive solar energy heating unit of claim 6, wherein:
said each of said fluid-tight container members is a vacuum formed panel of clearly optically transparent material.

9. The modular passive solar energy heating unit of claim 1, wherein:
said fluid-tight container member is mounted in an interior wall of an enclosed space to be heated, and
said transparent glazing in sheet form is mounted in an exterior wall of an enclosed space to be heated.

10. For mounting in a wall or roof of a building containing an enclosed space for living or working within the building near such wall or roof and for being in a solar-radiation-receiving position, a passive solar energy heating window unit, comprising:
a frame adapted to be mounted in such a wall or roof in such a position,
at least one flat fluid-tight container mounted within said frame and having opposite parallel, flat, rigid, surface areas of clearly optically transparent material, the inner of said surface areas facing inwardly toward such an enclosed space when said frame is mounted in such wall or roof in such position, and the outer of said surface areas facing outwardly toward the exterior of the building when said frame is so mounted in such position,
solar energy heat storage phase change material disposed in said container, said phase change material being polyethylene glycol characterized by a heat of fusion of about 33 to 37 ca./gm (4,170 to 4,670 Btu's per cubic ft.), a melting point of from about 13° to 25° C. (55° to 77° F.) and a specific gravity of approximately 1.125 to 20° C.,
said phase change material in said fluid-tight container being translucent milky white when in its low-stored-energy solid state and being clearly optically transparent to visible light when in its high-stored-energy liquid state for enabling a viewer to look through said fluid-tight container when said phase change material is liquid,
at least one clearly optically transparent glazing in flat sheet form mounted in said frame, said transparent glazing being spaced from the outer surface area of said fluid-tight container and being arranged in said frame on the opposite side of said fluid-tight container from said enclosed space when said frame is so mounted in such position for permitting solar radiation to pass through said glazing sheet and to impinge upon said outer transparent surface area of said fluid-tight container when said frame is so mounted in such position,
the outer side of said glazing sheet being disposed to face the incoming solar radiation, said inner side of said glazing sheet facing toward said outer transparent surface area of the fluid-tight container,
gas being included between said inner side of the glazing sheet and said outer surface area of the container,
said glazing sheet transmitting short wavelength solar and visible light rays while preventing longer wavelength heat rays from radiating through the glazing sheet,
whereby when said phase change material is in its low-stored-energy solid state said fluid-tight container member presents a back-illuminated milky white appearance to a viewer in said enclosed space,
whereby when said phase change material is in its high-stored-energy liquid state a viewer in said enclosed space can see through said fluid-tight container and through said glazing, and
whereby said phase change material releases its heat of fusion as it changes back into a solid state for maintaining the enclosed space at a comfortable temperature.

11. For mounting in a wall or roof of a building in a solar-radiation-receiving position, a passive solar energy heating window unit, as claimed in claim 10, in which:
said two spaced parallel planar glazing sheets of said fluid-tight containing are spaced approximately one centimeter apart from each other, and
said polyethylene glycol is in a planar layer approximately one centimeter thick.

12. For mounting in a wall or roof of a building in a solar-radiation-receiving position, a passive solar energy heating window unit, as claimed in claim 10, in which:
said inner and outer surface areas of said fluid-tight container are a pair of spaced parallel planar glazing sheet with said phase change material substantially filling the region between said pair of planar glazing sheets.

13. A passive solar energy heating window unit as claimed in claim 10, in which: a dye soluble in said phase change material is added to said material in said container for aesthetic effect, for increasing absorbtivity when said material is in its low-stored-energy translucent state and for decreasing penetration of sunlight directly into said enclosed state when said material is in its optically transparent high-stored-energy liquid state.

14. For mounting in a wall or roof of a building in a solar-radiation-receiving position, a passive solar energy heating window unit, as claimed in claim 10, in which
said glazing sheet has a reflective insulation layer covering it, said reflective layer being clearly optically transparent for visible light rays and being reflective of longer wavelength heat rays.

15. For mounting in a wall or roof of a building in a solar-radiation-receiving position, a passive solar energy heating window unit, as claimed in claim 10, in which:
at least one of said fluid-tight containers is mounted in said frame in one end of the frame and at least one of said fluid-tight containers is mounted in said frame in the other end of the frame and a window is mounted in said frame between said containers, said window having at least double glazing, and
at least one clearly optically transparent glazing sheet mounted in said frame outside of each of said fluid-tight containers and being spaced from the outside surface area of the container.

16. For mounting in a wall or roof of a building in a solar-radiation-receiving position, a passive solar energy heating window unit, as claimed in claim 15, in which:
a double-glazed window is mounted in said frame outside of each of said fluid-tight containers and being spaced from the outside surface area of the container.

17. A passive solar energy window heating unit for installation in a wall or roof of an enclosed space comprising:
a peripheral frame adapted to be mounted in the wall or roof in a position for receiving solar radiation,
at least one flat rigid fluid-tight container mounted within said frame and having two opposite parallel flat surface areas of clearly optically transparent rigid glazing material, the inner of said flat surface areas facing inwardly toward such an enclosed space when said frame is mounted in the wall or roof in such position, and the outer of said flat surface areas facing outwardly toward the exterior of the building when said frame is mounted in such position,
solar energy heat storage phase change material filling container, said phase change material being polyethylene glycol characterized by a heat of fusion of about 33 to 37 ca./gm. (4,170 to 4,670 Btu's per cubic ft.), a melting point of from about 13° C. to 25° C. (55° F. to 77° F.) and a specific gravity of approximately 1.125 at 20° C.,
said phase change material in said fluid-tight container being translucent milky white when in its low-stored-energy solid state and being clearly optically transparent to visible light when in its high-stored-energy liquid state for enabling a viewer in the enclosed space to look outdoors through said fluid-tight container and through said two parallel flat transparent glazing surface areas when said phase change material is liquid,
at least one clearly optically transparent glazing in flat sheet form mounted in said frame, said transparent glazing being spaced from and parallel to the outer flat surface area of said fluid-tight container and being arranged in said frame on the opposite side of said fluid-tight container from said enclosed space when said frame is mounted in such position for permitting solar radiation to pass through said glazing sheet and to impinge upon said outer transparent surface area of said fluid-tight container when said frame is mounted in such position,
the outer side of said glazing sheet facing the incoming solar radiation, the inner side of said glazing sheet facing toward said outer flat transparent surface area of the fluid-tight container,
said glazing sheet being transparent with respect to visible light rays while being opaque with respect to longer wavelength heat rays for transmitting visible light rays while preventing longer wavelength heat rays from radiating through the glazing sheet,
said phase change material in its low-stored-energy solid stage in said fluid-tight container member presenting a back-illuminted milky white appearance to a viewer in said enclosed space and thereby provides a diffuse pleasant daylight illumination in said enclosed space,
said phase change material in its high-stored-energy liquid state being clearly transparent for enabling a viewer in said enclosed space to see through said fluid-tight container and through said glazing sheet, and
said phase change materal releasing its heat of fusion as it changes back into a solid state in said temperature range of 13° C. to 25° C. (55° F. to 77° F.) for maintaining the enclosed space at a comfortable temperature in said range.

18. A passive solar energy window heating unit as claimed in claim 17, in which:
two clearly optically transparent planar glazing sheets of glass are mounted in said frame in spaced parallel relationship forming a double-glazed window, said double-glazed window being spaced from and parallel to the outer glass surface area of said flat fluid-tight container, and
said double-glazed glass window transmits visible light rays while preventing longer wavelength heat rays from radiating through them.

19. A passive solar energy window heating unit as claimed in claim 18, in which:
the inner surface of the outer glass glazing sheet of said double-glazed window is covered by a reflective insulation layer, said reflective layer being clearly optically transparent for visible light rays and being reflective of longer wavelength heat rays, and
dry gas between said two glazing sheets inert to said reflective insulation layer.

20. A passive solar energy window heating unit as claimed in claim 17, in which:
said two opposite parallel flat surface areas of said flat fluid-tight container of clearly optically transparent glazing material are glass, and
said clearly optically transparent glazing in flat sheet form mounted in said frame parallel to said flat container is also glass.

21. A passive solar energy window heating unit as claimed in claim 20, in which:

the inner of said flat glass surface areas facing inwardly toward the enclosed space is tinted.

22. A passive solar energy window heating unit as claimed in claim 20, in which:
    said glass sheet mounted parallel to said flat container is coated with a reflective insulation layer which is clearly optically transparent for visible light rays but is reflective of longer wavelength heat rays.

23. A modular passive solar energy window heating unit adapted to absorb and store solar energy and subsequently to release the stored energy as thermal energy in an enclosed space such as living space or office space, said unit being adapted to be installed into existing window openings on a retrofit basis comprising:
    outer and inner clearly optically transparent flat glass glazing sheets,
    a frame encircling said two glass glazing sheets holding them in spaced parallel relationship and sealing the region between said two glazing sheets for forming a fluid-tight container of generally overall planar configuration,
    solar energy heat storage phase change material essentially filling said planar container, said phase change material being polyethylene glycol characterized by a heat of fusion of about 33 to 37 ca./gm. (4,170 to 4,670 Btu's per cubic ft.), a melting point of from about 13° C. to 25° C. (55° F. to 77° F.) and a specific gravity of approximately 1.125 at 20° C.,
    said phase change material in said planar fluid-tight container being translucent milky white when in its low-stored-energy solid state for providing attractive illumination into the enclosed space from the window in which said retrofit unit is installed, and being clearly optically transparent to visible light when in its high-stored-energy liquid state for enabling a viewer in the enclosed space to look through said retrofit unit and out through the window, and
    said phase change material during phase change exhibits a change in volume of less than two percent during phase change for enabling the glass glazing sheets to accommodate such modest change in volume.

24. A modular passive solar energy window heating unit as claimed in claim 23, in which:
    a plurality of said glass-glazed fluid-tight containers are positioned one above another adjacent one to another in aligned vertical orientation for providing a relatively tall window unit, and
    each of said containers has a vertical height not exceeding 2.5 feet for keeping the hydrostatic pressure moderate in the phase change material contained between the outer and inner glass glazing sheets of each container.

25. A modular passive solar energy window heating unit as claimed in claim 23, in which:
    said glass glazing sheets are spaced apart approximately one centimeter (approximately 0.4 of an inch), and
    said polyethylene glycol is in a planar layer approximately one centimeter thick between said sheets.

26. A modular passive solar energy heating unit as claimed in claim 23, in which: a dye soluble in said phase change material in said container is added to said material for aesthetic effect, for increasing absorbtivity when said material is in its low-stored-energy translucent state and for decreasing penetration of sunlight directly into said enclosed state when said material is in its optically transparent high-stored-energy liquid state.

27. A modular passive solar energy window heating unit as claimed in claim 26, in which:
    the inner planar glass glazing sheet is tinted.

* * * * *